Nov. 26, 1968  F. T. PIACENT ET AL  3,413,584
THERMORESPONSIVE SWITCH
Filed Aug. 30, 1965  2 Sheets-Sheet 1
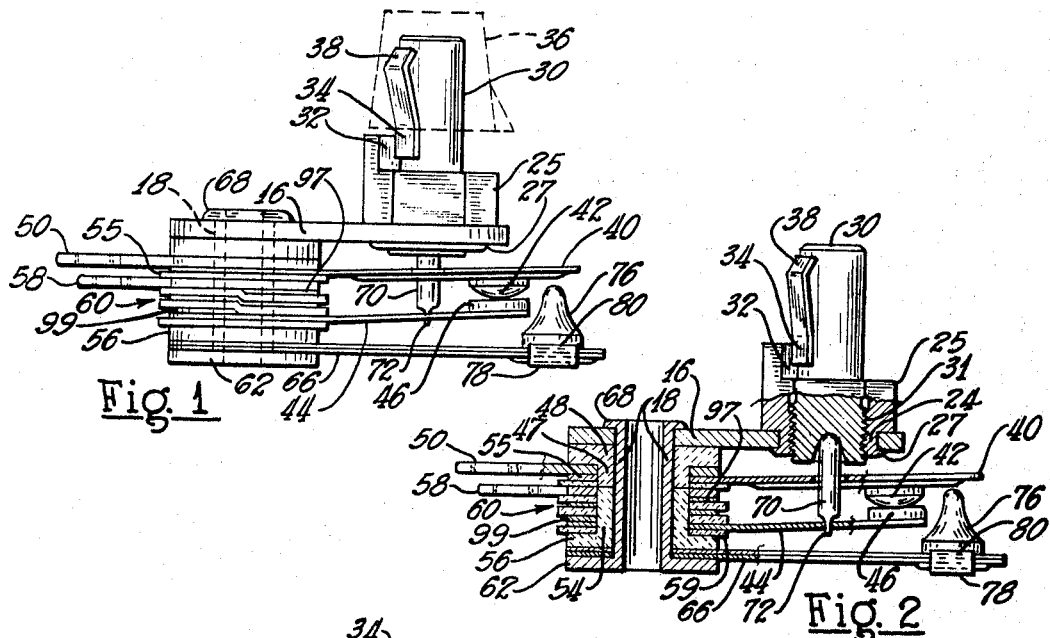
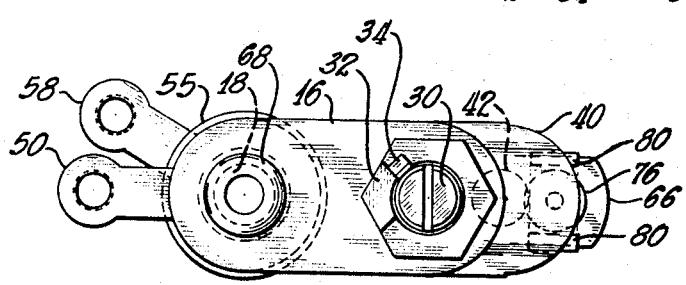
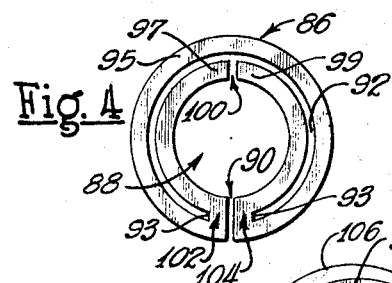
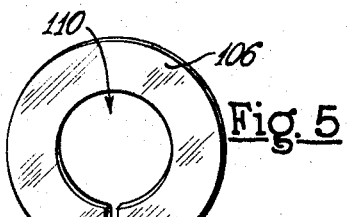
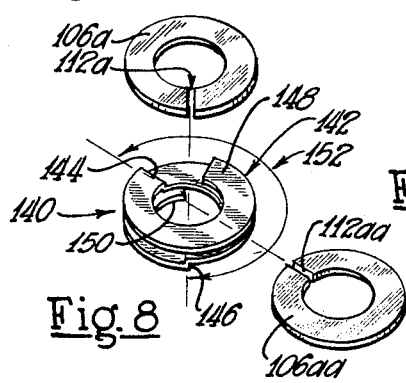
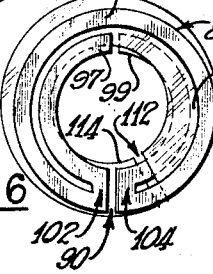
INVENTORS
FRANK T. PIACENT &
BY JOHN W. HUFFMAN
Harry O. Ernsberger
ATTORNEY Nov. 26, 1968  F. T. PIACENT ET AL  3,413,584
THERMORESPONSIVE SWITCH
Filed Aug. 30, 1965  2 Sheets-Sheet 2
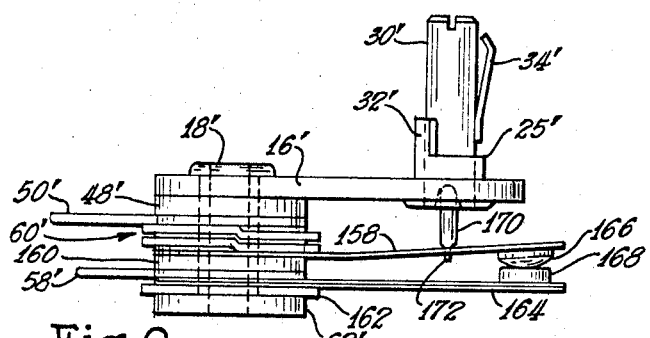
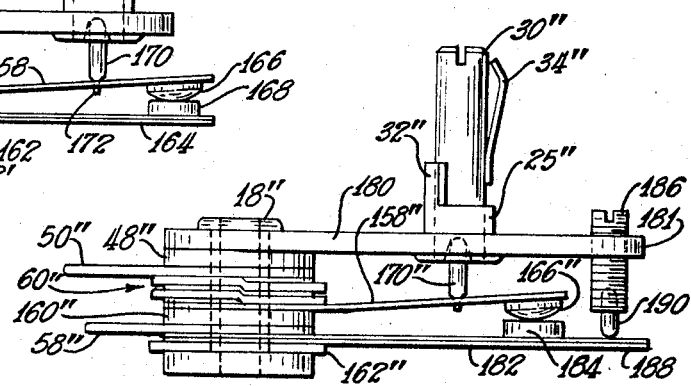
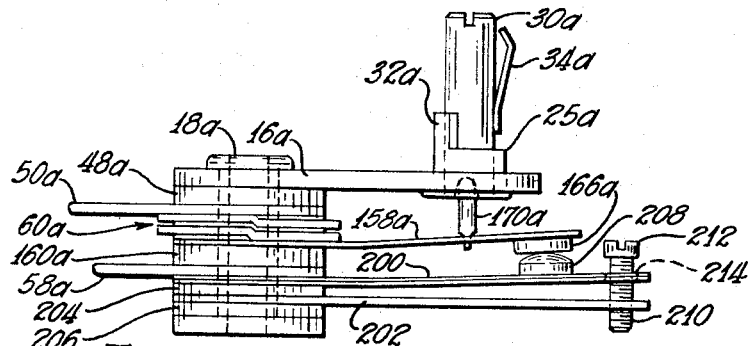
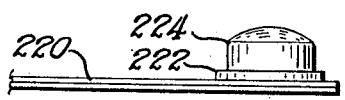
INVENTORS
FRANK T. PIACENT &
BY JOHN W. HUFFMAN
Harry O. Ernsberger
ATTORNEY United States Patent Office 3,413,584
Patented Nov. 26, 1968

3,413,584
THERMORESPONSIVE SWITCH
Frank T. Piacent and John W. Huffman, Mansfield, Ohio, assignors, by mesne assignments, to Emerson Electric Co., St. Louis, Mo., a corporation of Missouri
Filed Aug. 30, 1965, Ser. No. 483,471
10 Claims. (Cl. 337—100)

ABSTRACT OF THE DISCLOSURE

A thermoresponsive switch mechanism of the "stacked" switch type embodying supplemental heating means for accelerating and stabilizing the action of the thermoresponsive means wherein the supplemental heating means is wholly contained within the confines of the stacked switch support arrangement and heat from the supplemental heater transmitted by conduction to the thermoresponsive means.

---

This invention relates to thermoresponsive or thermostat switch means and more especially to a thermoresponsive switch means embodying manual control of the effective temperature operating range and incorporating auxiliary or supplemental heating means adapted to thermally influence the thermoresponsive means.

The invention particularly relates to thermoresponsive switches of the so-called "stacked" type wherein end regions of switch arms and a bimetal component are insulatingly mounted by circular members to provide a compact construction. Thermostat switches have been used extensively to maintain automatic control of a predetermined temperature embraced within a manual control particularly with appliances embodying heating elements, such as flat irons, grills, fry pans and other electrically energizable appliances.

In conventional switches of this character, a substantial time lag occurs in the transfer of heat to the bimetal component resulting in a substantial temperature differential of the appliance between "on" and "off" conditions of the circuit. Supplemental heaters in the form of small resistance units have been utilized for accelerating the action of the bimetal element and heretofore supplemental heaters have been positioned at regions spaced from the support means or stack assembly of the switch components. In such constructions where the resistance heater is spaced from the switch stack or extends outwardly from the stack, the heat responsive means or bimetal element is heated by convection and radiant heat. While such devices accelerate the operation of the thermoresponsive means and promote reduction in temperature differentials of the appliance in circuit with the switch means, appreciable "over-run" of the temperature is encountered in initial heating of the appliance and the repetitive cycling of the switch means by the thermoresponsive means or bimetal element is irregular and the temperature of the controlled appliance is not accurately maintained within a predetermined range.

The invention embraces a thermoresponsive switch mechanism embodying supplemental heating means for accelerating and stabilizing the action of the thermoresponsive means wherein heat from the supplemental heater is transmitted by conduction to the support region of the thermoresponsive means whereby temperature "over-run" during initial heating of an appliance is eliminated and wherein subsequent repeated cycling of the switch mechanism under the influence of the thermoresponsive means occurs at constant intervals to accurately maintain the appliance within a narrow temperature range.

The invention further embraces a switch mechanism of the so-called "stacked" type wherein the components of the switch mechanism are supported by substantially cylindrical mounting means and wherein a supplemental heating means is wholly contained within the support stack whereby the thermoresponsive means of the switch mechanism is influenced by heat of the supplemental heater conducted through the support stack.

Another object of the invention resides in an auxiliary or supplemental heater for influencing a thermoresponsive means of a "stacked" switch construction wherein the heating element is of generally circular contour for assembly in the support stack for the switch components whereby the heat developed by electric energy flow through the heater is effectively transmited through the support stack to the thermoresponsive means.

Another object of the invention resides in a circular shaped resistance heater for incorporation in the support means of a "stacked" switch wherein the heater is within the confines of the support arrangement to provide effective control and transfer of heat by conduction to the bimetal means of the switch mechanism enabling the utilization of the switch mechanism mounted by the heated body or instrumentality of the appliance or which may be employed as a cycling switch disposed in a position remote from the heated body or instrumentality of the appliance.

Another object of the invention resides in a novel form of resistance heater for use in a thermostat switch mechanism wherein portions of the resistance heater are insulated one from another by circular insulating means whereby the heating unit is embodied in a "stacked" switch mechanism without modification of the other components of the switch mechanism.

A further object of the invention is the provision of a supplemental heater which may be utilized in "stacked" switch constructions of various types and for various uses.

Another object of the invention embraces a switch construction of the "stacked" type wherein one of the contact-carrying switch arms is fashioned of bimetal and the support stock including a supplemental resistance heater disposed within the confines of the support stack whereby the bimetal switch arm is influenced by heat from the supplemental heater conducted through the stack.

Another object embraces a switch construction of the "stacked" type embodying a switch arm of bimetal influenced by conducted heat from a supplemental heater within the confines of the support stack in combination with means for limiting the movement of the bimetal switch arm assuring a positive interruption of the circuit whenever a manually controlled switch arm is moved to an "off" position.

A further object of the invention resides in a switch mechanism of the "stacked" type embodying a switch arm and contact arrangement in combination with means disposed between the switch arm and contact for reducing arcing at the contacts.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an enlarged elevational view of a thermostat switch construction of the invention;

FIGURE 2 is a sectional view of the switch construction shown in FIGURE 1;

FIGURE 3 is a top plan view of the switch construction shown in FIGURE 2;

FIGURE 4 is an enlarged top plan view of one form of supplemental heater element of the switch construction;

FIGURE 4A is a side view of the construction shown in FIGURE 4;

FIGURE 5 is an isometric view of an insulating member for assembly with the resistance heater element shown in FIGURE 4;

FIGURE 6 is a plan view of the heater element of FIGURE 4 illustrating the method of assembly of an insulating member shown in FIGURE 5;

FIGURE 7 is a view similar to FIGURE 6 illustrating the method of assembly of the heater element with a second member of the character shown in FIGURE 5;

FIGURE 8 is an isometric view illustrating a modified form of supplemental heater construction for the thermostat switch and insulating members in dissembled relation;

FIGURE 9 is an elevational view of a switch of the invention embodying a switch arm of bimetal;

FIGURE 10 is an elevational view of a switch having a bimetal switch arm with a movement limiting means;

FIGURE 11 is an elevational view of another form of movement limiting means for a bimetal switch arm, and FIGURE 12 is a detail view illustrating a means for reducing arcing of the contacts of the switch mechanism.

While the arrangement of the invention is particularly adaptable for controlling the temperature of electrically heated appliances, it is to be understood that the supplemental heater arrangement may be employed in other forms of control mechanism for influencing a thermoresponsive means.

Referring to the drawings in detail and initially to FIGURES 1 through 3, there is illustrated a form of switch means embodying the invention which may be utilized for controlling the temperature of an electrically heated appliance where the switch means may be disposed to be influenced by heat from the appliance, or the switch means may be mounted in a position away from the influence of heat from an appliance and function as a cycling switch actuated solely by heat from the supplemental heater embodied in the support stack of the switch construction.

The switch construction illustrated in FIGURES 1 through 3 is approximately twice actual size and is the type of switch usually referred to as a stacked switch, viz. a switch mechanism wherein the switch components, the bimetal element or thermoresponsive means and circular insulating members are in vertically spaced stacked relation.

The switch construction is inclusive of a plate or member 16 forming a part of a support means for certain components of the switch, the plate 16 being provided with a bore through which extends a sleeve 18. Assembled on the sleeve are switch arms, a thermoresponsive means, a supplemental heater and insulating members. The switch construction constitutes a unit which may be disposed in any position with respect to an appliance to be controlled.

The plate 16, forming a component of the support means, is provided with an opening to receive a tenon portion 24 of a bushing or fitting 25, the tenon portion being swaged as at 27 into engagement with the lower surface of the plate 16 for fixedly securing the bushing or fitting 25 to the plate 16. Disposed within the bushing is a shaft 30 having a threaded portion 31 engaging an interiorly threaded region of the bushing 25, the shaft being rotatable for manually controlling the relative position of one of the switch arms in a manner hereinafter explained.

The fitting 25 is provided with an abutment 32 which cooperates with a stop means 34 carried by the shaft 30 for limiting the rotative movement of the shaft 30. A manipulating knob 36, shown in broken lines in FIGURE 1, is telescoped onto the shaft 30, a portion 38 of the stop means 34 extending into a groove in the manipulating knob 36 whereby rotation of the knob effects rotation of the shaft 30. The range of rotation of the shaft 30 is slightly less than one complete revolution, being limited by engagement of the stop means 34 with the abutment 32. This movement limiting means for the shaft 30 determines the range of temperature within which the manual control means may be adjusted.

The switch construction is inclusive of a first switch arm or member 40 fashioned of a strip of metal adapted to be flexed or moved under the influence of a thermoresponsive means, the switch member 40 being equipped with a contact 42.

A second flexible switch member 44, formed of a strip of metal and of flexible character is equipped with a contact 46 arranged for cooperation with the contact 42 to complete and interrupt a circuit.

A circular end region of the switch member or arm 40 is provided with an opening to receive a tenon 47 of an annular disc or member 48 of insulating material which surrounds the support sleeve 18. A terminal member 50 is also provided with an opening to accommodate the tenon 47, the metal terminal 50 being in direct metallic contact with the switch arm 40. The member 48 insulates the terminal 50 from the support plate 16. The tenon 47 insulates both the terminal 50 and the switch member 40 from the support sleeve 18, the terminal 50 being connected with the current supply conductor (not shown).

A second terminal 58 is received on the upper end of an annular insulating member 54 on the sleeve 18 and an insulating member or mica disc 55 insulates the terminal 58 from the first switch arm 40. The second switch member 44 has an opening in an end region through which extends the annular insulating member 54. The second terminal or connector 58 is connected to the heating element or heating unit (not shown) of an appliance to be controlled. Disposed above the switch member 44 and between the switch member 44 and the terminal 58 and mounted on the annular insulating member 54 is a supplemental heating unit 60 for influencing the thermoresponsive means and which will be hereinafter described in detail.

The sleeve 18 is provided at its lower end with a flange 62. Mounted on the flange 62 between the flange 62 and a flange 56 of the insulating member 54 is a thermoresponsive means or bimetal element 66, the bimetal element having an opening receiving the sleeve 18. It will be seen from FIGURE 1 that the above described components comprising the insulating washers or members 48, 54 and 55 of circular contour, the switch members 40 and 44, the terminals 50 and 58, and the supplemental heating unit 60 are arranged in "stacked" relation on the support sleeve 18.

After assembly of these components on the sleeve 18, the upper end of the sleeve 18 is swaged as at 68 to secure the support stack of components in assembled relation. The insulating members or washers 48 and 54 may be fashioned of lava or insulating ceramic to withstand heat generated by the supplemental heating unit 60.

The switch member 44 is adapted to be manually adjusted with respect to the switch member 40 to a temperature at which it is desired to maintain an appliance to be controlled by the switch mechanism. Disposed between the lower end of the rotatable shaft 30 and the switch member 44 is an insulating strut or member 70 fashioned of lava or ceramic, one end of the strut being engaged in a socket or recess in the lower end of the shaft 30. The other end region of the strut 70 is fashioned with a wedge-shaped portion 72 which engages in a rectangular opening in the switch member 44, this construction preventing relative rotation of the strut 70 when the adjusting shaft 30 is manually rotated.

The strut 70 extends through a clearance opening 74 in the switch arm 40 as shown in FIGURE 1. Through this arrangement manual rotation of the shaft 30, through the medium of the strut 70, is effective to adjust or control the relative position of the switch arm 44 for the temperature desired for the appliance. The bimetal element 66 is flexed by heat from the supplemental heater 60 for thermostatically controlling the position of the switch member 40 to automatically maintain a predetermined temperature of the appliance within the manual range of temperature setting or adjustment of the shaft 30.

The distal end of the bimetal element 66 is provided with an opening to receive an insulating member 76, formed of ceramic or lava which is held or secured to the bimetal element 66 by a metal clip 78 fashioned with ear portions 80 which, in assembly, are bent to embrace the edges of the element 66.

The present invention embodies a supplemental, auxiliary or accelerating heater unit 60 oriented or disposed in the support stack construction of switch components and insulating members shown in FIGURE 1 in a manner whereby heat from the supplemental heater is conducted through the support stack to the bimetal element 66 whereby the bimetal element is influenced principally by conducted heat rather than by convection as in supplemental heating units heretofore utilized to accelerate movement of a bimetal element.

The supplemental heater of the invention is inclusive of a heating element of a configuration whereby it is wholly within the confines of the support stack of the switch components. One form of supplemental heating element of this character and associated insulating means for the heater are illustrated in FIGURES 4 through 7. The heater element is of the resistance type and is fashioned to provide a substantial length or path of resistance traversed by the current by fashioning the element to provide for traverse of the current in a generally circular path.

The heating element or resistance unit 86 is shown per se in FIGURES 4 and 4A. The heater element 86 is fashioned of a flat sheet of metal and is of generally circular shape and is comparatively thin as shown in FIGURE 4A. The circular opening 88 of the annularly-shaped or circular heater 86 is of a dimension to slidably fit onto the exterior surface of the annular insulating member 54 as shown in FIGURE 2. The annular configuration is split or slotted radially as at 90.

A circularly shaped slot 92 preferably concentric with the circular periphery of the heater terminates at regions 93, configurating the circular element into an annularly-shaped outer portion 95 and two semiannular inner portions or legs 97 and 99, the distal ends of the semiannular portions 97 and 99 being separated by a radial slot 100. The unslotted regions 102 and 104 form integral bridge or connector means connecting the outer annular portion 95 to the inner semiannular portions or legs 97 and 99 as particularly shown in FIGURE 4.

Regions of the semiannular portions or legs 97 and 99 form contact portions for engagement or connection respectively with the switch arm 44 and the terminal 58 assembled in the stacked support formation shown in FIGURES 1 and 2. The heater construction is inclusive of two annularly-shaped insulating members or discs 106 and 106' which are of identical construction, member 106 being illustrated in FIGURE 5. These insulating members are preferably fashioned of heat resistant insulating material, such as mica, and are made as thin as practicable so as to provide for compact assembly in the support stack construction.

Each of the annular members 106 and 106' is of an exterior diameter preferably slightly greater than the exterior diameter of the annular portion 95 of the resistance heater 86 to prevent possible current leakage. The circular opening 110 of each of the annular members 106 and 106' is of a diameter to snugly, yet slidably fit onto the annular insulating member 54, shown in FIGURE 1, each of the members being split or slotted as at 112 to enable assembly of the insulating members with the resistance heater element 86.

The method of assembling the insulating members 106 and 106' with the heater element 86 is illustrated in FIGURES 6 and 7.

With reference to FIGURE 6, the insulating member 106 is slidably moved laterally in the direction of the arrow in assembly with the heater 86 with the terminal leg portion 97 and the annular portion 95 at the upper side of the insulating disc 106 with the other terminal leg 99 adjacent the opposite major surface or lower side of the insulating disc 106, an assembly which is made possible through the use of the slot 112.

It should be noted that in assembly the disc 106 is preferably rotatably adjusted so that the slot 112 is adjacent the terminal region 93 of the circular slot 92 whereby a terminal portion 114 of the disc 106 straddles or covers the slot 90, as shown in FIGURE 6. The insulating disc 106 is moved in the direction of the arrow in assembly until the exterior periphery of the insulating disc 106 is concentric with the circular portion 95, in which position the circular central opening 88 of the heating element 86 is in registry with the circular opening 110 in the insulating disc 106.

With disc 106 and heater 86 pre-assembled as above described, these components are then assembled with the second insulating disc 106'. In assembling disc 106' with the heating element 86, the insulating disc is moved in the direction of the arrow, as shown in FIGURE 7, with the slot 112' preferably adjacent the terminal region 93 of the leg 97 so that a portion 114' of the insulating disc straddles or covers the slot 90 and the connecting bridges 102 and 104.

The disc 106 has been omitted from FIGURE 7 for purposes of illustration. As shown in FIGURE 7, the terminal or leg portion 97 of the inner portion of the heater element 86 is above the insulating disc 106'.

Through this method assembly of the resistance heating element 86 with the insulating discs 106 and 106', one terminal leg 99 is exposed and adjacent an outer surface of the insulating disc 106, and the other terminal leg 97 is at the exposed or outer side of the insulating disc 106'.

It should be noted that the slots 112 and 112' are at oppositely disposed regions of the slot 90 in the resistance heater so that the bridge or connecting sections 102 and 104 are insulated one from the other. In the final assembly of the pre-assembled heating element and insulating discs 106 and 106' in the switch stack in the manner shown in FIGURE 1, the terminal leg 99 is in direct metallic contact with the switch arm 44 and the other leg 97 in direct metallic contact with the terminal 58.

With respect to FIGURE 4, the current flow path through the resistance heater 86 is as follows: The terminal leg 97 is in contact with the terminal 58 and the terminal leg 99 is in contact with the switch arm 44 and, when the contacts 42 and 46 are in circuit closing or contacting position, current flows through the terminal leg 97 across the bridge section 102 through the annular portion 95 through slightly less than a complete circle to the bridge section 104, through the bridge section 104 to the terminal leg 99 and through the switch arm 44 which is in metallic contact with the terminal leg 99.

The effective resistance heating length of the element 86 is an elongated path of generally circular shape from the region of engagement of the terminal leg 97 with the switch arm 44, through the bridge 102, the annular portion 95, the bridge 104 and to the region of contact of the terminal leg 99 with the connector 58 of the switch construction. Through this method and arrangement, a substantially long flow path of current through the resistance heater element is provided to produce a substantial amount of heat in the support stack construction shown in FIGURE 1.

Substantially all of the heat is conducted through the stack, viz. through the insulating member 54 and sleeve 18 to the region of the bimetal adjacent the flange 56 of the insulating member 54. The heating unit 86 is disposed above the switch arm 44. If it is desirable to further retard transfer of heat through the support stack, an insulating disc 59 may be disposed between the flange 56 of member 54 and the switch arm 44.

From the foregoing description it will be apparent that the heat from the circular resistance heater construction or unit 86 is transferred to the bimetal element 66 almost entirely by conduction through the stack so that a controlled transfer of heat from the heating unit 86 to the bimetal element 66 is through the support stack construction.

By varying the thickness of the flange portion 56 of the insulating member 54 or that of the insulating disc 59, the rate of heat transfer by conduction to the bimetal element 66 may be accelerated or retarded depending upon the controlled characteristics desired for thermostatically controlling the position of the switch arm 40 and hence the automatic cycling of the circuit under the influence of the bimetal element 66.

In operation, with the contacts 42 and 46 closed, the heating element is energized, and heat therefrom influences the bimetal element 66 to cause flexure of the element upwardly, engaging the lava member 76 with the switch arm 40 to elevate the switch arm 40 and separate the contacts 42 and 46 to interrupt the energizing circuit through the heater 86. De-energization of the heating element 86 results in cooling of the support stack and the bimetal element 66. As the bimetal element 66 is cooled, it flexes in the opposite direction, moving the strut 76 away from the switch arm 40 and again re-engaging contacts 42 and 46. The switch arm 40 is initially tensioned or stressed to bias the switch arm 40 in a direction to normally engage the contacts 42 and 44 to complete the heater energizing circuit. In this manner, repeated cycling of the switch occurs at equal intervals of time.

The heating unit 86 and insulating discs 106 and 106' provide a compact, adequately insulated supplemental heating element incorporated in the switch stack or support stack whereby the heat from the heating element for influencing the bimetal element is transferred solely through the stack.

It is found that through this novel type of supplemental heater construction, more accurate automatic control of the desired temperature for an appliance is attained and "over-run" of temperature during initial warm-up of an appliance is eliminated.

The heater or element is within the peripheral confines of the annular insulating members of the switch support stack so that heat generated by current flow through the resistance heater 86 is conducted through the components in the stack to the supported area of the bimetal element 66. The construction lends itself to varying the control of the transfer of heat to the bimetal element.

If a rapid transfer of heat to the bimetal element 66 is desired, then the flange 56 of the insulating member 54 may be reduced in thickness and the insulating disc 59 removed to shorten the heat conductor path from the heater to the bimetal element. The thickness of the circular-shaped mica insulators 106 and 106' may be modified to vary the rate of heat transfer to the thermoresponsive element. If retarded transfer of heat is desired, the thickness of the flange 56 may be increased to thereby increase the length of the heat transfer path through the support stack.

Thus the supplemental heat from the heater 86 may be modified as above-mentioned to vary the amplitude of temperature between "on" and "off" periods of the switch mechanism as well as the frequency of the "on" and "off" cycles depending upon the characteristics of control desired for the appliance.

The effective length of the resistance path of the resistance heater element shown in FIGURES 4 through 7 may be varied by changing the relative position of rotation of each of the insulating members 106 and 106' with respect to the bridges 102 and 104 between the annular portion 95 and the semicircular terminal leg portions 97 and 99. Thus by further rotating the mica insulating dics 106 in a counterclockwise direction, as viewed in FIGURE 6, the effective length of the leg portion 99 in contact with the switch arm 44 is shortened. By rotating the disc 106' a further distance in a clockwise direction as viewed in FIGURE 7, the slot 112' is moved farther away from the slot 90 and the length of the leg 97 in contact with the switch member 44 is shortened.

By shortening the length of contact of the legs 97 and 99 with the terminal 58 and switch member 44, the effective length of the resistance path of current flow through the heater is increased. Thus the effective resistance of the heater element 86 in developing heat from current flow therethrough may be varied in a measure by adjusting the relative rotational positions of the insulating discs 106 and 106'. After assembly of the insulating members, switch components, bimetal element 66 and the heater unit 60 on the sleeve 18, the swaging of the sleeve as at 68 compacts the assembly to hold the components including the mica insulating discs 106 and 106' in assembled fixed positions.

FIGURE 8 illustrates a modified form of circular resistance heater for incorporation in the support stack of the switch mechanism. The resistance heater 140 comprises a spirally configured strip 142 providing an annular shape, the inner diameter of the open area defined by the spiral being of a dimension to slidably fit over the insulating member 54 shown in FIGURE 1. The strip 142 is comparatively thin and is of a width and thickness to secure the desired resistance factor to provide supplemental heat in the switch support stack. Insulating washers or discs of mica 106a and 106aa, which are slotted as at 112a and 112aa provide for asembling the mica insulating discs with the heater strip 142.

The heater strip 142 is preferably provided with two slightly offset portions 144 and 146 to facilitate assembly and positioning of the insulating discs 106a and 106aa therewith. The spiral strip 142 has terminal portions 148 and 150 for contact respectively with the switch arm 44 and the terminal 58 when the heater construction of FIGURE 10 is embodied in the switch construction of FIGURE 1 in lieu of the heater unit 86. In assembling the disc 106aa with the heater strip 142 the slot 112aa accommodates the offset 144 whereby the terminal portion 148 of the heater strip 142 is above the insulating disc 106aa.

In assembling the insulating disc 106a with the heater strip 142, the slot 112a accommodates the offset 146 whereby the terminal portion 150 is beneath the insulating disc 106a.

The effective resistance heating area or length of the heater strip 142 is the circular distance between the offset regions 144 and 146 which distance is schematically indicated by the circular line 152, this portion being insulated by the insulating discs from the terminal portions 148 and 150.

It is to be understood that the effective length of the resistance portion of the strip indicated by the line 152 may be lengthened or shortened by changing the relative positions of the offset portions 144 and 146 so long as the resistance path is less than a complete circle and the offset regions 144 and 146 maintained out of alignment or registration. The inner diameter of each of the insulating discs 106a and 106aa is of a dimension to snugly fit over the insulating member 54 shown in FIGURE 1. Thus the heater construction shown in FIGURE 8 in a stacked switch construction supplies supplemental heat for influencing a bimetal element such as bimetal element 66 of FIGURE 1.

FIGURE 9 illustrates a modified form of switch construction of the invention. This form includes a support plate 16' forming a component of the support stack of components assembled on a sleeve 18'. Secured to the support plate 16' is a fitting or bushing 25' interiorly threaded to receive a manually rotatable shaft 30'.

The fitting 25' is fashioned with an abutment 32' and the shaft 30' equipped with a stop means 34' which cooperates to define rotational movement of the shaft 30'. The support stack includes an annular insulating member 48', a terminal 50', a supplemental heating unit 60', a switch arm 158, a circular insulating member 160 and a terminal 58'.

The sleeve 18' is fashioned with a flange portion 62', and disposed adjacent the flange portion is an insulating member or disc 162 which may be of mica, lava or ceramic material. Disposed between the insulating member 162 and the terminal 58' in the stack is a bimetal element 164 which functions as a switch arm in the switch construction. The switch arm 158 is provided with a contact 166 and the distal end of the bimetal switch arm 164 is equipped with a contact 168 which cooperates with the contact 166 for controlling a circuit through an applicance (not shown) with which the switch may be utilized.

Mounted in a recess in the lower end of the shaft 30' is a rigid strut 170 of lava or other suitable insulating material, the lower end of the strut being wedge-shaped as at 172, the wedge-shaped portion extending into a substantially rectangular opening in the switch member or arm 158. In this arrangement, the bimetal switch arm 164 is referred to as a first switch arm or member and the switch arm 158 referred to as the second switch member or arm. One terminal leg of the resistance heating unit 60 is in metallic contact with the connector 50', and the other terminal leg of the heating unit in metallic contact with the switch arm 158.

The shaft 30' is equipped with a manipulating knob (not shown) for rotating the shaft which, through its threaded connection with the fitting 25', varies the relative position of the switch arm 158. This manual adjustment is for positioning the switch arm 158 for the temperature desired for the appliance controlled by the switch mechanism. The bimetal switch arm 164 is influenced by heat conducted through the support stack from the heating unit 60' which may be of the character illustrated in FIGURES 4 through 7, or that illustrated in FIGURE 8, to actuate or flex the bimetal switch arm 164 to automatically maintain the applicance at the temperature for which the switch arm 158 has been manually adjusted.

The flow path of the current through the supplemental resistance heater 60 and switch mechanism is as follows: The terminal 50' is connected to one side of a current supply line (not shown) and the terminal 58' connected with an appliance to be controlled and which is connected to the other current supply line in a conventional manner. Current flows from terminal 50' through the supplemental resistance heating unit 60' through the switch arm 158, contacts 166 and 168, bimetal switch arm 164, and through terminal 58' to the appliance.

Current is thus supplied to the appliance until sufficient heat generated by the resistance heater 60' is transferred or conducted through the support stack to the bimetal switch arm 164 to flex the member 164 downwardly to separate the contacts 166 and 168, interrupting current flow through the heater 60' and the appliance with which the switch is connected.

Interruption of current flow through the heater 60' results in a cooling of the bimetal switch arm 164, causing the bimetal arm to be flexed upwardly and reengage the contacts 166 and 168 to reestablish the circuit. Thus the circuit through the appliance is periodically completed and interrupted at equal intervals of time through the cycling action of the bimetal switch arm 164 influenced by heat from the heater 60'. The switch mechanism is particularly usable as a cycling switch where the switch is disposed in an environment influenced only by the heat from the supplemental heating unit 60'.

FIGURE 10 illustrates a switch construction similar to that shown in FIGURE 9 with the inclusion of means for securing a positive "off" position for the switch when the manual means is rotated to a full "off" position to positively effect a separation of the contacts. The switch construction includes a support plate or member 180 to which is secured a sleeve 18", the support stack including the following switch components: An insulating member 48", a terminal 50", a supplemental resistance heating unit 60", a switch arm 158", an insulating member 160" and a terminal 58".

Disposed between an insulating member 162" in the switch stack and the terminal 58" is a bimetal switch arm 182 which is in direct metallic contact with the terminal 58". One terminal leg of the supplemental resistance heater 60" is in direct metallic contact with the terminal 50", and the other terminal leg of the heater is in direct metallic contact with the switch arm 158". The switch arm 158" is equipped with a contact 166" and the bimetal switch arm 182 equipped with a contact 184 which cooperates with the contact 166".

The manually rotatable shaft 30" is threaded into the threaded interior of the fitting 25", and a strut 170" of lava or ceramic is disposed between shaft 30" and switch arm 158" for effecting manual adjustment of the relative position of the switch arm 158". Abutment means 32" on the fitting 25" cooperates with the stop means 34" to define the limits of rotation of shaft 30". The support plate 180 is fashioned with an extension 181 having a threaded opening receiving an adjusting screw or member 186. The bimetal switch arm 182 is provided with an extension 188 disposed beneath the screw 186. Positioned between the extension 188 of the bimetal switch arm and the screw 186 is a rigid strut 190 of lava, ceramic or other rigid insulating material.

The functioning of the switch mechanism shown in FIGURE 10 is substantially the same as the functioning of the switch mechanism shown in FIGURE 9, the circuit being successively completed and interrupted at regular intervals through the contacts 166" and 184 by alternate flexing of the bimetal switch arm 182 in opposite directions through energization and de-energization of the supplemental resistance heater 60".

To assure that the contacts 166" and 184 are positively separated when the manually rotatable shaft 30" is in its "off" position, the screw 186 is adjusted so that the strut 190 is engaged by the bimetal switch arm 182 to limit upward movement of the contact 184 so that when the shaft 30" is in "off" position, the contacts 166" and 184 are separated.

The switch construction shown in FIGURE 11 embodies a modified form of positive "off" means for assuring interruption of the circuit when the manual adjustment is moved to an "off" position. The construction shown in FIGURE 11 includes a support plate 16a secured to a sleeve 18a, the support stack including an insulating member 48a, a terminal 50a, a supplemental resistance heating unit 60a, switch arm 158a, an insulating member 160a, a terminal 58a and a bimetal switch arm 200. The switch construction includes a rigid plate or member 202 having one end mounted in the support stack and insulated from the sleeve 18a by an annular insulating disc 204.

The plate 202 is insulated from the sleeve 18a by an annular insulating disc 206. The switch arm 158a is provided with a contact 166a and the bimetal switch arm 200 provided with a contact 208. The plate 16a is equipped with a bushing or hollow fitting 25a interiorly threaded to accommodate a shaft 30a, a rigid strut 170a of insulating material being disposed between the switch arm 158a and the shaft 30a whereby rotation of the shaft 30a varies the relative position of the switch arm 15a. The fitting 25a is equipped with an abutment 32a, and a stop means 34a on the shaft 30a cooperating therewith defines the limits of rotation of the shaft 30a.

The distal end region of the rigid stationary plate 202 has a threaded opening accommodating a threaded member or screw 210 having a head portion 212. The projecting end region of the bimetal switch member 200 is provided with a clearance opening 214 to accommodate flexure of the switch arm 200 in normal operation without engaging the screw 210. The screw 210 is adjusted relative to the rigid plate 202 and the flexible bimetal switch arm 200 so that when the shaft 30a is manually moved to a full "off" position, the head 212 of the screw 210 limits upward movement of the bimetal switch member 200 and hence upward movement of the contact 208 whereby the contact 208 is positively separated from contact 166a.

The operation of the switch construction shown in FIGURE 11 is the same as the operation of the switch mechanism shown in FIGURE 10. The resistance heating unit 60a is in circuit between the terminal 50a and the switch arm 158a and heat conducted through the support stack to the bimetal switch arm 200 influences the switch arm 200 to effect repeated cycling of the switch through the periodic engagement and breaking of the contacts 166a and 200a by successive energization and de-energization of the heating unit 60a whereby the current flow to an appliance (not shown) with which the switch may be used is automatically maintained substantially at a constant temperature for which the manually rotatable shaft 30a is adjusted.

FIGURE 12 illustrates a means for retarding transfer of heat resulting from arcing at the contacts to the bimetal switch arm. In this construction the bimetal switch arm 220 is provided with a disc 222 of metal of low thermal conductivity such as stainless steel, the disc being welded or otherwise bonded to the bimetal switch arm 220. A contact 224 is bonded to the upper surface of the stainless steel disc 222.

The stainless steel disc 222, being disposed between the bimetal switch arm 220 and the contact 224, retards the transfer of heat, which may result from arcing of the contacts, to the bimetal element 220. Through this arrangement, heat resulting from arcing of the contacts does not appreciably impair the normal cycling movements of the bimetal switch arm 220 under the influence of heat conducted through the support stack of the switch from a supplemental heater. It is to be understood that the stainless steel disc 222 may be embodied in the switch mechanisms shown in FIGURES 9, 10 and 11.

It will be apparent from the description of FIGURES 9 through 11 that a thermostatically operated switch is provided wherein one of the switch members is a bimetal element and is influenced solely by heat conducted through a support stack of a switch from a resistance heating unit disposed wholly within the confines of the switch stack, providing accurate and reliable control for a cycling switch.

It is apparent that, within the scope of the invention, modifications and different arrangements may be made other than as herein disclosed, and the present disclosure is illustrative merely, the invention comprehending all variations thereof.

We claim:

1. Switch mechanism, in combination, switch means including a flexible switch arm, a bimetal element, cooperating switch contacts carried by said switch arm and bimetal element, support means for said switch arm and bimetal element including members of insulating material arranged in a stack, manually operable means carried by said support means having operative engagement with the switch arm for adjusting the relative position of the switch arm, electrically energizable heating means including a circularly-shaped heating element disposed in the stack within the confines of the stack whereby heat established by current flow through the heating element is conducted through the stack to the bimetal element.

2. Switch mechanism, in combination, switch means including a flexible switch arm, a bimetal element, cooperating switch contacts carried by said switch arm and bimetal element, support means for said switch arm and bimetal element including members of insulating material arranged in a stack, manually operable means carried by said support means having operable engagement with the switch arm for adjusting the relative position of the switch arm, electrically energizable heating means including a circularly-shaped heating element disposed in the stack within the confines of the stack, said heating element having a resistance heating portion and terminal leg portions integrally connected with the resistance heating portion, and insulating means engaged with opposite sides of the resistance heating portion for spacing said heating portion from the terminal leg portions whereby to establish a circuitous path for current flow through the resistance heating portion.

3. Switch mechanism, in combination, switch means including a flexible switch arm, a bimetal element, cooperating switch contacts carried by said switch arm and bimetal element, support means for said switch arm and bimetal element including members of insulating material arranged in a stack, manually operable means mounted by the support means having operative engagement with said switch arm to vary the relative position thereof, an electrically energizable resistance heater in said stack, said heater comprising a circularly-shaped strip disposed within the confines of said insulating members and being in circuit with said contacts whereby heat established by current flow through the resistance heater is conducted through the stack to the bimetal element for flexing the bimetal element, and adjustable abutment means mounted by the support means for limiting the flexing movement of the bimetal element toward the switch arm.

4. Switch mechanism, in combination, switch means including a flexible switch arm, a bimetal element, cooperating switch contacts carried by said switch arm and bimetal element, support means for said switch arm and bimetal element including circular members of insulating material arranged in a stack, manually operable means carried by said support means having operative engagement with the switch arm for adjusting the relative position of the switch arm, electrically energizable heating means including a circularly-shaped heating element disposed within the stack, said heating element having a circularly-shaped resistance heating portion and terminal leg portions integrally connected with the resistance heating portion, and insulating discs engaged with the circularly-shaped resistance heating portion at the respective sides thereof for spacing said portion from the terminal leg portions whereby current flow through the resistance heating portion is in a circular path.

5. Switch mechanism, in combination, switch means including a flexible switch arm, a bimetal element, cooperating switch contacts carried by said switch arm and bimetal element support means for said switch arm and bimetal element including circular members of insulating material arranged in a stack, manually operable means carried by said support means having operable engagement with the switch arm for adjusting the relative position of the switch arm, electrically energizable heating means including a circularly-shaped heating strip associated with the circular members of insulating material, said heating element having a circularly-shaped resistance heating portion and terminal leg portions integrally connected with the resistance heating portion, insulating means engaged with the respective sides of the circularly-shaped resistance heating portion for spacing said portion from the terminal leg portions whereby current flow through the resistance heating portion occurs in a circular path, said circular heating strip being disposed within the confines of the circular members of insulating material whereby heat established by current flow through the heating means is conducted through the stack to the bimetal element for flexing the bimetal element, and abutment means mounted by the support means for limiting the relative movement of the bimetal element toward the switch arm.

6. Switch mechanism, in combination, switch means including a flexible switch arm, a bimetal element, cooperating switch contacts carried by said switch arm and bimetal element, support means for said switch arm and bimetal element including circular members of insulating material arranged in a stack, manually operable means carried by said support means having operable engagement with the switch arm for adjusting the relative position of the switch arm, electrically energizable heating means including a circularly-shaped heating element in said stack, said heating element having a circular slot and a radial slot forming an annular resistance heating portion and two terminal portions, said terminal portions being integrally joined with the annular portion by connecting bridge sections defined by the radial slot whereby current flows in a circular path through the annular portion from one terminal portion to the other terminal portion, insulating discs adjacent said heating element for spacing the terminal portions from the annular portion normal to the plane of the annular portion, said heating element being in circuit with said contacts whereby current flow through said heating element when said contacts are in closed position establishes heat conducted through the stack to the bimetal element for actuating the bimetal element.

7. Switch mechanism, in combination, switch means including a flexible switch arm, a bimetal element, cooperating switch contacts carried by said switch arm and bimetal element, support means for said switch arm and bimetal element including circular members of insulating material arranged in a stack, manually operable means carried by said support means having operable engagement with the switch arm for adjusting the relative position of the switch arm, electrically energizable heating means including a circularly-shaped heating element in said stack, said heating element having a circular slot and a radial slot forming an annular resistance heating portion and two terminal portions, said terminal portions being integrally joined with the annular portion by connecting bridge sections defined by the radial slot whereby current flows in a circular path through the annular portion from one terminal portion to the other terminal portion, a pair of insulating discs adjacent said heating element for spacing the terminal portions from the annular portion in a direction normally to the plane of the annular portion, said heating element being disposed within the confines of said insulating discs and in circuit with said contacts whereby current flow through said heating element when said contacts are in closed position establishes heat conducted through the stack to the bimetal element for actuating the bimetal element, and adjustable abutment means mounted by the support means for limiting relative movement of the bimetal element toward the switch arm to provide positive separation of the contacts when the manually operable means is moved to an "off" position.

8. Switch mechanism, in combination, support means including a plate and a cylindrical member secured to the plate, a first flexible switch arm, a second flexible switch arm, insulating means mounted on the cylindrical member and supporting said switch arms, contact means on each of said switch arms, a bimetal element mounted by the cylindrical member, manually operable means mounted by said plate and engaging the second switch arm to vary the relative position of said second switch arm, said bimetal element being arranged to influence the relative position of said first switch arm, a resistance heater surrounding the cylindrical member and insulated therefrom, said heater being disposed between said first and second switch arms and shaped to provide a circular path for current flow through the heater, said heater being disposed within the confines of said insulating means and being in circuit with said contacts whereby heat established by current flow through the resistance heater is conducted through the insulating means to the bimetal element for flexing the bimetal element.

9. Switch mechanism, in combination, support means including a plate and a cylindrical member secured to the plate, a first flexible switch arm, a second flexible switch arm, insulating means mounted on the cylindrical member and supporting said switch arms, contact means on each of said switch arms, a bimetal element mounted by the cylindrical member, manually operable means mounted by said plate and engaging the second switch arm to vary the relative position of said second switch arm, said bimetal element being arranged to influence the relative position of said first switch arm, a resistance heater surrounding the cylindrical member and insulated therefrom, said heater being disposed between said first and second switch arms, said heater being disposed within the confines of said insulating means and being in circuit with said contacts whereby heat established by current flow through the resistance heater is conducted through the insulating means to the bimetal element for flexing the bimetal element, and adjustable abutment means mounted by the support means for limiting the flexing movement of the bimetal element toward the switch arm.

10. Switch mechanism, in combination, switch means including a flexible switch arm, a bimetal element, cooperating switch contacts carried by said switch arm and bimetal element, support means for said switch arm and bimetal element including circular members of insulating material arranged in a stack, manually operable means carried by said support means having operable engagement with the switch arm for adjusting the relative position of the switch arm, electrically energizable heating means including a circularly-shaped heating element associated with the circular members of insulating material, said heating element having a circularly-shaped resistance heating portion and terminal leg portions integrally connected with the resistance heating portion, insulating means engaged with opposite sides of the circularly-shaped resistance heating portion for spacing said portion from the terminal leg portions whereby current flow through the resistance heating portion is in a circular path, said heating means being within the confines of the circular members of insulating material whereby heat established by current flow through the heating means is conducted through the stack to the bimetal element for flexing the bimetal element.

References Cited
UNITED STATES PATENTS

| | | | |
|---|---|---|---|
| 2,185,130 | 12/1939 | Morrill et al. | 200—113 |
| 2,241,262 | 5/1941 | Keitel | 200—166 |
| 2,414,463 | 1/1947 | Gunn et al. | 200—166 |
| 2,847,554 | 8/1958 | Huffman | 200—122 |
| 3,188,431 | 6/1965 | Levinn | 200—122 |
| 2,298,164 | 10/1942 | Raney | 200—122 |
| 2,402,240 | 6/1946 | Crise | 200—122 |
| 2,518,941 | 8/1950 | Satchwell et al. | 200—122 |

BERNARD A. GILHEANY, *Primary Examiner.*

H. BROOME, *Assistant Examiner.*